United States Patent
Kennedy

(10) Patent No.: US 7,124,582 B2
(45) Date of Patent: Oct. 24, 2006

(54) METHOD AND APPARATUS FOR DETERMINING TURBOCHARGER BOOST

(75) Inventor: Michael P. Kennedy, Wheaton, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 3 days.

(21) Appl. No.: 10/899,466

(22) Filed: Jul. 26, 2004

(65) Prior Publication Data
US 2006/0016188 A1   Jan. 26, 2006

(51) Int. Cl.
F02M 25/07 (2006.01)
F02B 29/00 (2006.01)
F02B 33/44 (2006.01)
F02B 29/04 (2006.01)
F02D 23/00 (2006.01)

(52) U.S. Cl. .................. 60/605.2; 60/602; 60/611; 123/568.11; 123/568.21

(58) Field of Classification Search .............. 60/602, 60/605.2, 611; 123/568.11, 568.21
See application file for complete search history.

(56) References Cited

U.S. PATENT DOCUMENTS

| | | | | |
|---|---|---|---|---|
| 4,478,043 A | * | 10/1984 | Kobayashi et al. | 60/608 |
| 6,000,221 A | * | 12/1999 | Church et al. | 60/602 |
| 6,089,018 A | * | 7/2000 | Bischoff et al. | 60/602 |
| 6,134,890 A | * | 10/2000 | Church et al. | 60/602 |
| 6,155,049 A | * | 12/2000 | Bischoff | 60/602 |
| 6,178,749 B1 | * | 1/2001 | Kolmanovsky et al. | 60/605.2 |
| 6,233,934 B1 | * | 5/2001 | Church et al. | 60/602 |
| 6,419,464 B1 | | 7/2002 | Arnold | |
| 6,427,445 B1 | * | 8/2002 | Isaac et al. | 60/602 |
| 6,508,237 B1 | * | 1/2003 | Romzek et al. | 60/605.2 |
| 6,604,361 B1 | * | 8/2003 | Buckland et al. | 60/605.2 |
| 6,637,205 B1 | * | 10/2003 | Ahmad et al. | 60/608 |
| 6,681,573 B1 | * | 1/2004 | Arnold | 60/602 |
| 6,698,409 B1 | * | 3/2004 | Kennedy et al. | 123/568.21 |
| 7,047,953 B1 | * | 5/2006 | Kennedy | 123/568.11 |

FOREIGN PATENT DOCUMENTS

JP 05172008 A * 7/1993

* cited by examiner

Primary Examiner—Sheldon J Richter
(74) Attorney, Agent, or Firm—Susan L. Lukasik; Dennis K. Sullivan; Elias P. Soupos

(57) ABSTRACT

A method of determining an adjusted boost signal includes determining a steady-state boost for a turbocharger (103, 105) for an internal combustion engine (101). The steady-state boost is adjusted (509, 513) for at least one of current transient speed conditions and current transient load conditions of the internal combustion engine, yielding an adjusted boost signal. The adjusted boost signal is sent (517) to the turbocharger.

18 Claims, 4 Drawing Sheets

METHOD AND APPARATUS FOR DETERMINING TURBOCHARGER BOOST

FIELD OF THE INVENTION

This invention relates to internal combustion engines, including but not limited to control of turbochargers for internal combustion engines.

BACKGROUND OF THE INVENTION

A turbocharger is known to supercharge an internal combustion engine. Air enters the engine through a turbocharger via a compressor, which pressurizes the air. The pressurized air flows to an intake manifold and enters the cylinders of the engine. The compressor is coupled to a turbine, which is driven by exhaust gas from the cylinders. The exhaust gas from the cylinders enters an exhaust manifold and flows into the turbine. The exhaust gas exits the turbine and is vented to the atmosphere. A fraction of the exhaust gas may be diverted from entering the turbine and routed back to the intake manifold. The compressor boosts pressure in the engine air intake system downstream of the compressor. The boost is controlled by controlling turbine operation.

Improper turbocharger control may result in poor engine performance, including stumbling and hesitation, as well as excessive smoke and undesirable hydrocarbon and oxides of nitrogen (NOx) emissions.

Accordingly, there is a need for a turbocharger control system that improves engine performance and reduces undesirable emissions.

SUMMARY OF THE INVENTION

A method of determining an adjusted boost signal includes determining a steady-state boost for a turbocharger for an internal combustion engine. The steady-state boost is adjusted for at least one of current transient speed conditions and current transient load conditions of the internal combustion engine, yielding an adjusted boost signal. The adjusted boost signal is sent to the turbocharger.

DESCRIPTION OF A PREFERRED EMBODIMENT

The following describes an apparatus for and method of determining boost for a turbocharger, for example, by sending a turbo control signal to control vane positions within the turbocharger for an internal combustion engine. The boost may be adjusted for transient engine speed conditions and/or transient engine load conditions, e.g., by adjusting the vane positions. During high transient states, e.g., speed and/or load transients, the vanes are more closed, which increases turbocharger shaft speed, thereby allowing more air to reach the cylinders of the engine and improving engine performance.

Figure 1:
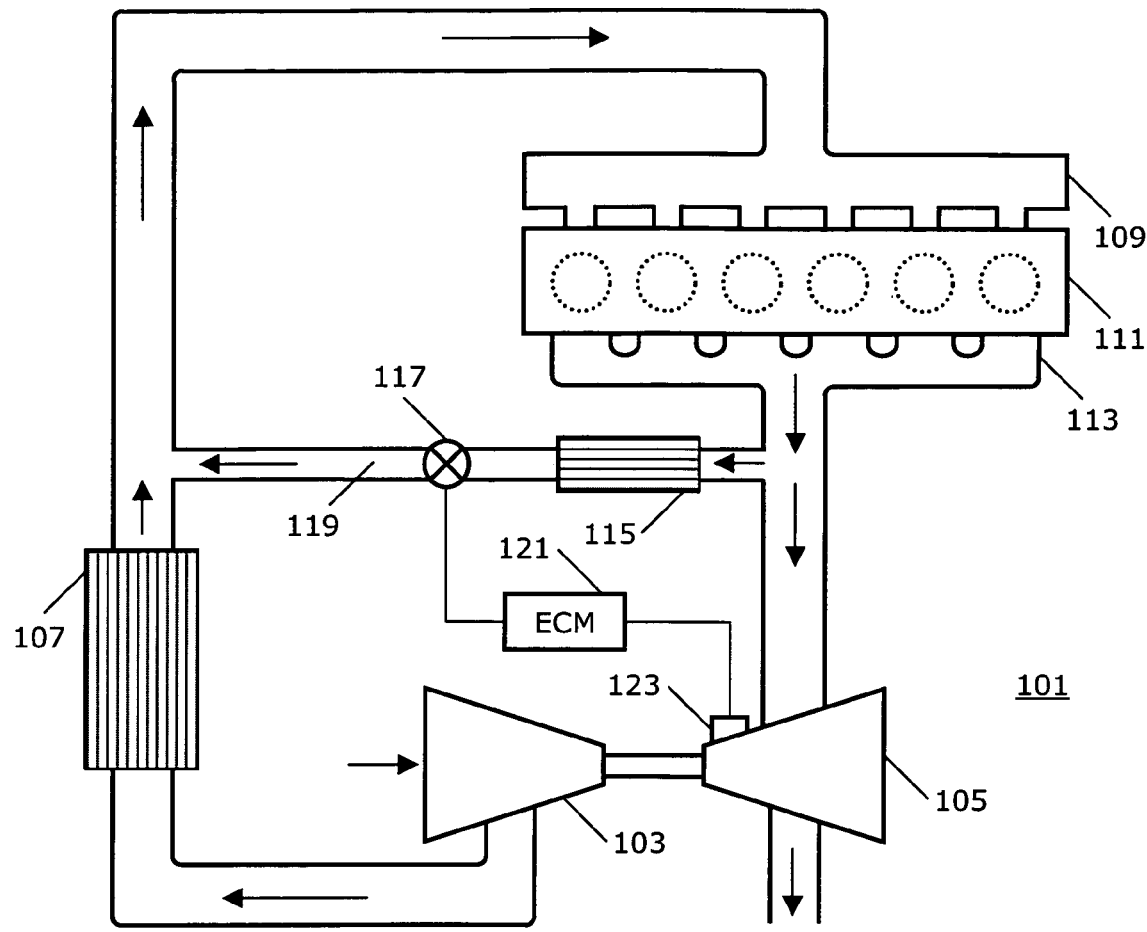
FIG. 1 is a block diagram of an internal combustion engine utilizing a turbocharger in accordance with the invention.

A block diagram of an internal combustion engine 101 is shown in FIG. 1. Air enters a compressor 103 of a turbocharger that also includes a turbine 105 on the same shaft as the compressor 103. The compressor 103 boosts pressure in the engine air intake system downstream of the compressor 103. Compressed air exits the compressor 103 and is cooled by an intercooler 107. Cooled air output by the intercooler 107 and cooled exhaust gas enter the intake manifold 109 before entering the cylinders 111. Exhaust gas from the cylinders 111 enters an exhaust manifold 113, which feeds part of the exhaust gas through an EGR cooler 115, EGR valve 117 and EGR outlet 119 before cooled exhaust gas and compressed air from the intercooler 107 are combined. The rest of the exhaust gas drives the turbine 105, where exhaust gas exits the system. An Engine Control Module (ECM) 121 controls the boost or exhaust backpressure for the turbocharger through an actuator 123, the position for the EGR valve 117, and other engine functions.

A method and apparatus for providing control for a turbocharger having a plurality of vanes whose position determines the amount of boost is shown in U.S. Pat. No. 6,427,445 titled "Variable Nozzle Turbine Control Strategy" and issued on Aug. 6, 2002, the entire contents of which are hereby incorporated by reference.

Figure 2:
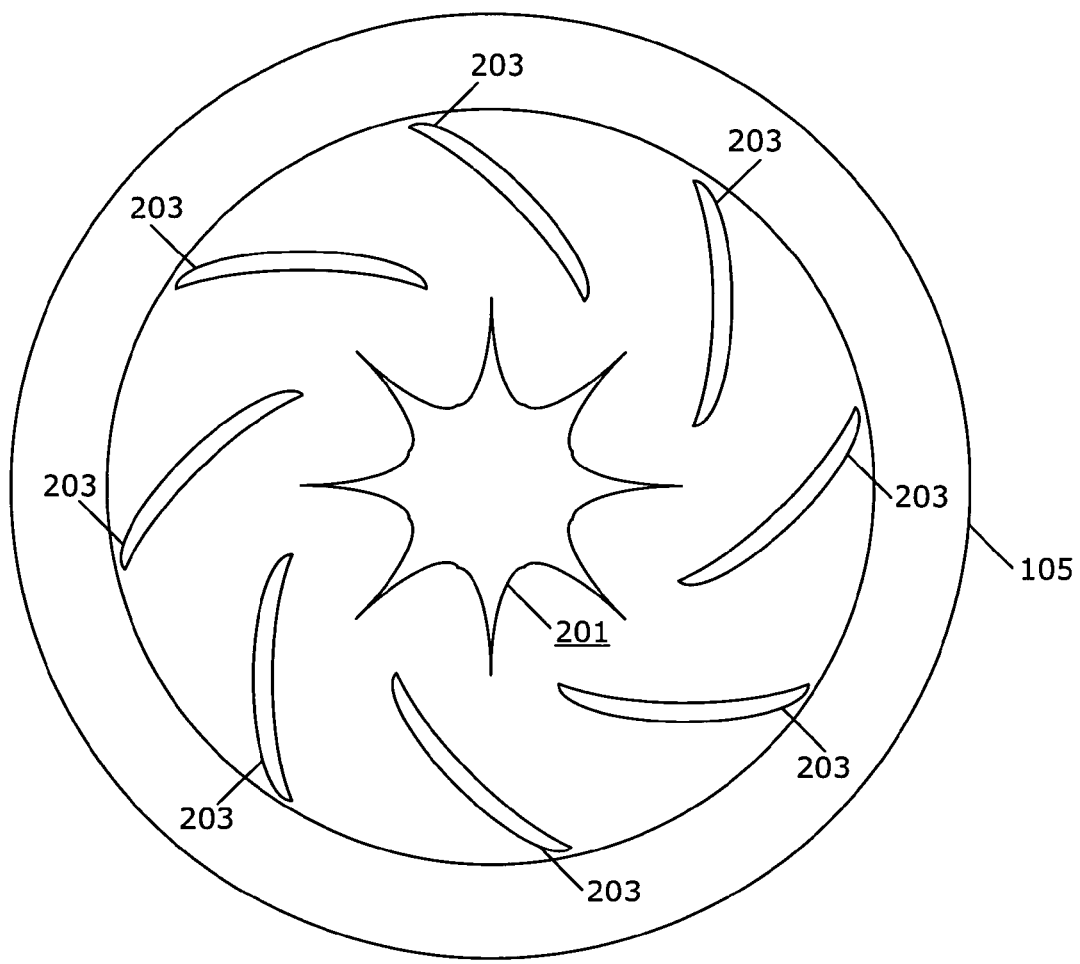
FIG. 2 and FIG. 3 illustrate various vane positions in a turbocharger in accordance with the invention.
Figure 3:
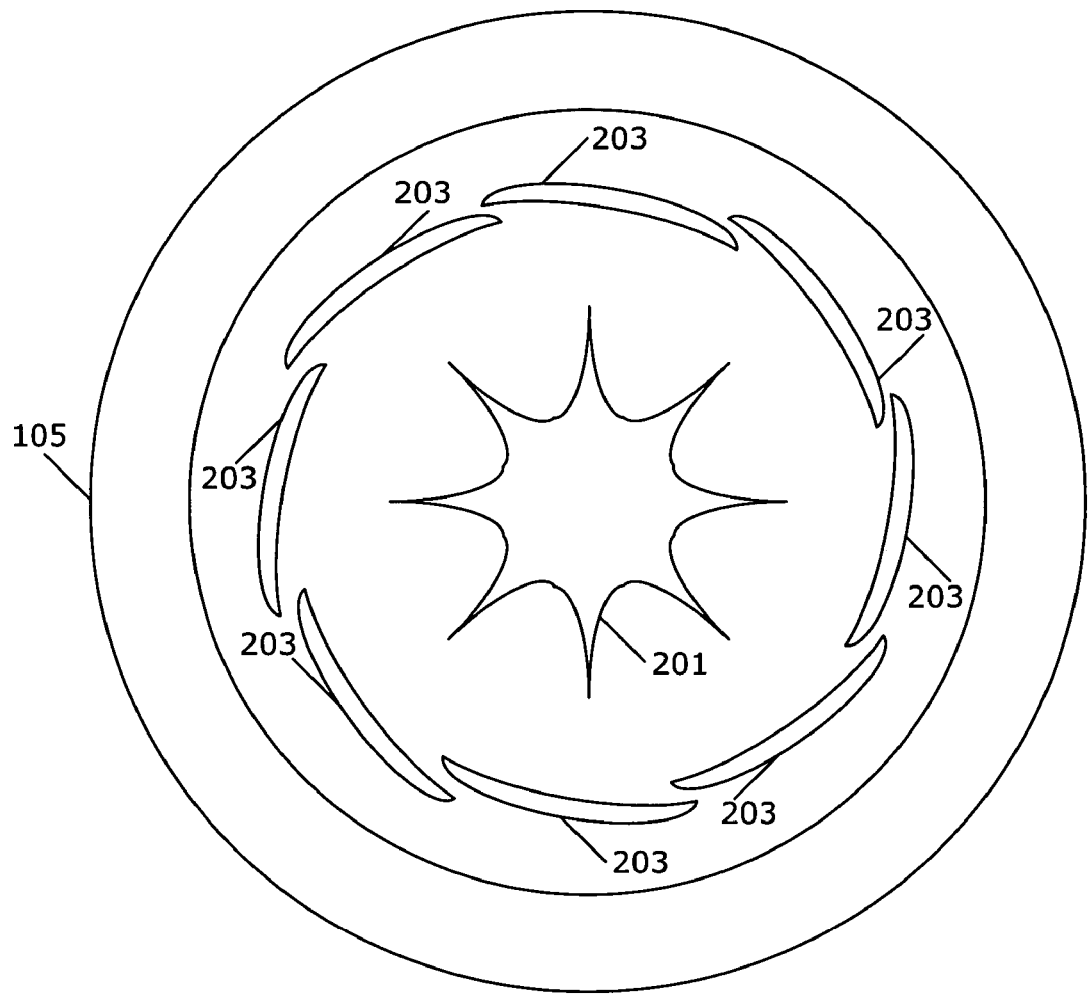

A turbocharger that has a variable geometry, or variable nozzle, is capable of changing the manner in which exhaust gas interacts with the turbine 105, and hence controlling the pressure, i.e., boost, that the compressor 103 creates in the engine intake manifold 109. An illustration of vane positions in such a turbocharger is shown in FIG. 2 and FIG. 3. One type of variable geometry turbocharger comprises movable vanes 203 whose positions control the nature of exhaust gas interaction with the turbine wheel 201. The vanes 203 are shown in a more open position in FIG. 2 and in a more closed position in FIG. 3. The position of the vanes 203 is controlled by a boost or turbo control signal, e.g., a pulse-width modulated signal, that is sent by the ECM 121 to the actuator 123, such as an electromechanical actuator with a solenoid. The vane position may be set, for example, according to the extent to which the solenoid is electrically energized. The actuator 123 may utilize a medium, such as a fluid, that is controlled by the actuator to impart movement to the vanes 203. An example of a variable nozzle turbocharger is shown and described in U.S. Pat. No. 6,419,464 titled "Vane for Variable Nozzle Turbocharger" that issued on Jul. 16, 2002, the entire contents of which are hereby incorporated by reference.

Figure 4:
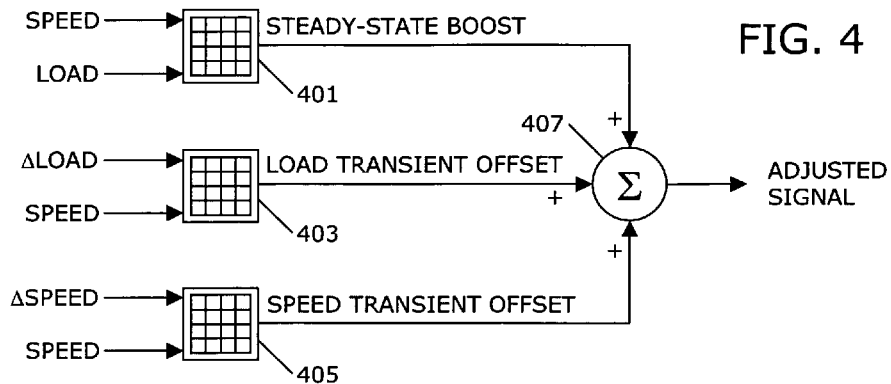
FIG. 4 is a block diagram of a part of an engine control module that determines turbocharger boost in accordance with the invention.

A block diagram of a part of an ECM that determines turbocharger boost is shown in FIG. 4. A steady-state boost or turbo control signal is output from a steady-state boost determiner, or steady-state turbo control signal determiner, 401 based on engine speed and load, as known in the art. The steady-state turbo control signal determiner 401 may, for example, utilize a table, such as Table 1 below, to determine the steady-state boost signal. The values for the steady-state turbo control signal are between 0% (minimum turbocharger boost) and 100% (maximum turbocharger boost) duty cycle, or between 0 and 1, where 0% duty results in 0 vane travel or fully open vanes and low boost or backpressure and 100% duty cycle equals maximum vane travel or fully closed vanes and maximum boost or backpressure.

TABLE 1

| | | \multicolumn{5}{c}{LOAD in (mg/stk)} | | | | |
|---|---|---|---|---|---|---|
| | | 30 | 40 | 50 | 60 | 70 |
| N RPM | 700 | 100 | 90 | 80 | 70 | 60 |
| | 1200 | 90 | 80 | 70 | 60 | 50 |
| | 1700 | 80 | 70 | 60 | 50 | 40 |
| | 2200 | 70 | 60 | 50 | 40 | 30 |
| | 2700 | 60 | 50 | 40 | 30 | 20 |

The determiners 401, 403, and 405 may be implemented, for example, by look-up tables stored in memory for access by the ECM 121. In Tables 1 through 3, engine speeds are measured in revolutions per minute (RPMs), engine loads are fuel demand amounts or requests for fuel. Load or fuel demand is determined by the ECM 121 as a function of the amount of fuel required to maintain a desired engine speed/load and may be measured in mg/stk. The vane positions shown in Table 1 are interpreted as 0 is completely open, 100 is fully closed, and values in between 0 and 100 represent how open (as a percentage) the valve is, e.g., 10% closed, 30% closed, 50% closed, and so forth.

A load transient offset signal is output from load transient offset determiner 403 based on engine speed and change in load ($\Delta$Load). The load transient offset determiner 403 may, for example, utilize a table, such as Table 2 below which illustrates example load transient offsets for various engine speeds and transient loads, to determine the load transient offset. The load transient offset improves turbocharger operation during engine load transients. Generally, as the load transient increases, the load transient offset increases, thereby closing the vanes more, thus increasing backpressure to thereby increase the boost pressure. The load transient offset varies from 0% to 100% or from 0 to 1.

TABLE 2

| | | \multicolumn{6}{c}{$\Delta$LOAD in (mg/stk)/s} | | | | | |
|---|---|---|---|---|---|---|---|
| | | −20 | −10 | −5 | +5 | +10 | +20 |
| N RPM | 700 | 35 | 25 | 0 | 0 | 25 | 35 |
| | 1200 | 30 | 20 | 0 | 0 | 20 | 30 |
| | 1700 | 25 | 15 | 0 | 0 | 15 | 25 |
| | 2200 | 20 | 10 | 0 | 0 | 10 | 20 |
| | 2700 | 15 | 5 | 0 | 0 | 5 | 15 |
| | 3000 | 10 | 0 | 0 | 0 | 0 | 10 |

Engine load changes or transients may occur at constant engine speed or at varying engine speed conditions. Load transients may be determined by comparing actual fuel demand amounts or requests for fuel at different times. The times may be separated by, for example, 0.5 seconds. Rapid increases in engine load/fueling in a given time period may exist. During these engine conditions, the air-to-fuel ratio is low, and increased turbo boost is desirable. Table 2 reflacts various levels of load transients and how intensely the vane 203 positions are not affected.

The load transient offset causes the vanes to close more when the transient load conditions are large, and the load transient offset does not affect the vane position as much when the current transient load conditions are small or non-existent. When large transient load conditions are present in the engine, sufficient air may not be present for the engine, and increasing boost in the turbocharger by adjusting, e.g., increasing, the turbo control signal allows for more air to reach the engine, thereby improving its performance during load transient conditions.

A speed transient offset signal is output from speed transient offset determiner 405 based on engine speed and change in engine speed ($\Delta$N). The speed transient offset determiner 405 may, for example, utilize a table, such as Table 3 below which illustrates example speed transient offsets for various engine speeds and transient speeds, to determine the speed transient offset. The speed transient offset improves turbocharger operation during engine speed transients. Generally, as the speed transient increases, the speed transient offset increases, thereby closing the vanes more, thus increasing backpressure to thereby increase the boost pressure. The speed transient offset varies from 0% to 100% or from 0 to 1.

TABLE 3

| | | \multicolumn{6}{c}{$\Delta$N in RPM} | | | | | |
|---|---|---|---|---|---|---|---|
| | | −100 | −50 | −25 | +25 | +50 | +100 |
| N RPM | 700 | 30 | 25 | 0 | 0 | 25 | 30 |
| | 1200 | 25 | 20 | 0 | 0 | 20 | 25 |
| | 1700 | 20 | 15 | 0 | 0 | 15 | 20 |
| | 2200 | 15 | 10 | 0 | 0 | 10 | 15 |
| | 2700 | 10 | 5 | 0 | 0 | 5 | 10 |
| | 3000 | 5 | 0 | 0 | 0 | 0 | 5 |

Speed transients may be determined by comparing engine speeds at different times. The times may be separated by, for example, 0.5 seconds. Rapid increases in engine speed in a given time period may exist. During these engine conditions, the air-to-fuel ratio is low, and increased boost is desirable. Table 3 reflects various levels of speed transients and how intensely the vane 203 positions are or not affected.

The speed transient offset causes the vanes to close more when the current transient speed conditions are large, and the speed transient multiplier does not affect the vane position as much when the current transient speed conditions are small or non-existent. When large speed transient conditions are present in the engine, sufficient air may not be present for the engine, and increasing boost, for example, by increasing the turbo control signal to the turbocharger, allows more air to reach the engine, thereby improving its performance during speed transient conditions.

A combiner 407 adds the steady-state boost or turbo control signal to the load transient offset signal and the speed transient offset signal, yielding an adjusted boost or adjusted turbo control signal that is fed to the actuator 123 to control the turbocharger boost. In the event that the result of the summation of the steady-state turbo control signal plus the load transient offset and the speed transient offset is greater than 1 or 100% duty cycle, the adjusted turbo control signal is capped at 1 or 100% duty cycle. Although the steady-state boost signal is described as having load transient and speed transient offsets added to it, the load and speed transient offsets may be multipliers that are applied to the steady-state boost signal to achieve the desired results.

The actuator 123 receives the adjusted boost or adjusted turbo control signal from the ECM 121 and adjusts the vanes 203 to a position corresponding to the value of the adjusted turbo control signal. For example, to completely close the vanes 203, an adjusted turbo control signal with value 1 may be utilized, whereas an adjusted turbo control signal with value 0 may be utilized to fully open the vanes 203. Various intermediate positions between open and closed may also be utilized, e.g., 0.1 for 10% closed vanes, 0.5 for a half-closed vanes 203, and so forth.

Additional or fewer data points may be utilized in Tables 1, 2, and 3 depending on the desired degree of accuracy and/or the range of values for variables. Other values may be interpolated. Engine speeds, engine loads, speed transients, load transients, speed ranges, load ranges, and transient ranges will vary depending on the engine. The present invention provides for engine load transients and engine speed transients may be adapted for independently. Combinations of various levels of such transients are also taken into account.

Figure 5:
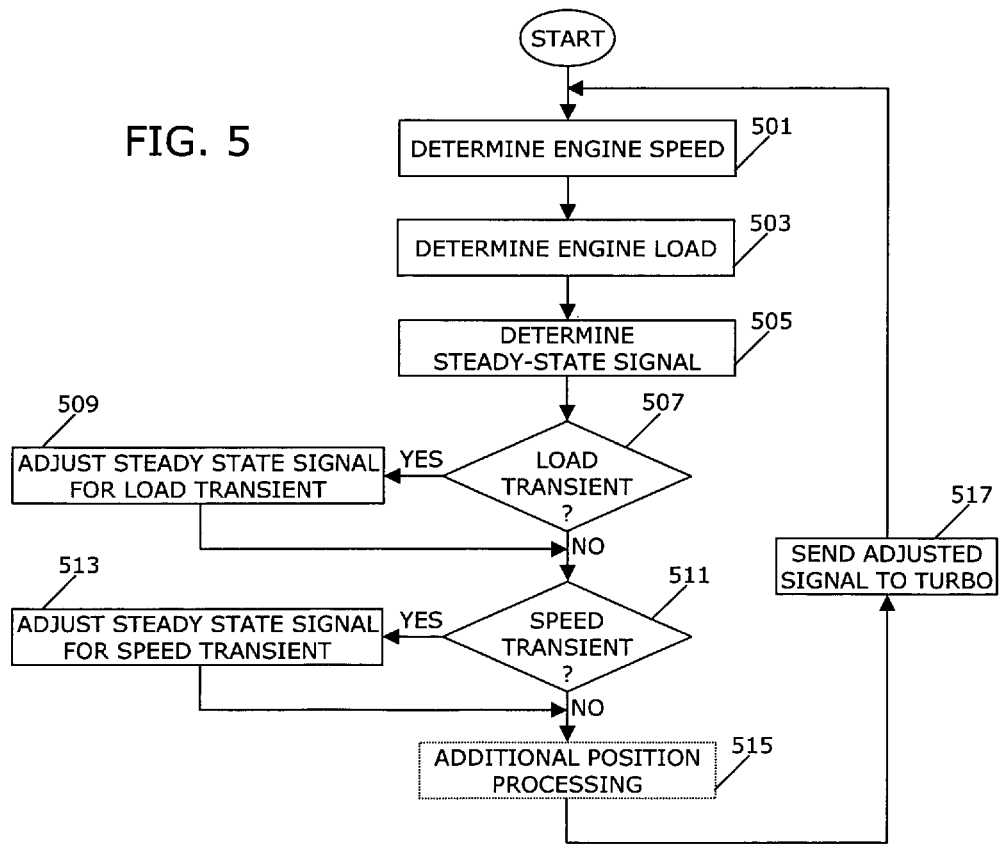
FIG. 5 is a flowchart illustrating a method of determining turbocharger boost in accordance with the invention.

A flowchart illustrating a method of determining turbocharger boost is shown in FIG. 5. The steps of the flowchart are performed by the ECM 121 in the embodiment shown in the figures. At step 501, current engine speed for the internal combustion engine is determined. At step 503, current engine load for the internal combustion engine is determined. At step 505, steady-state turbo control signal, based on desired boost for the turbo, is determined. If at step 507, a load transient is present, the steady-state turbo control is adjusted at step 509, for example, by adding a load transient offset to the steady-state turbo control, thereby increasing boost. If at step 507, a load transient is not present, no adjustment is made to the steady-state turbo control, i.e., the load transient offset equals 0.

The process continues with step 511, where it is determined whether a speed transient is present in the engine. If at step 511, a speed transient is present, the steady-state turbo control is adjusted at step 513, for example, by adding a speed transient offset to the steady-state turbo control, thereby increasing boost. If at step 511, a speed transient is not present no adjustment is made to the steady-state turbo control, i.e., the speed transient offset equals 0.

At step 515, optional additional processing, such as the processing provided by the ECM 121, may be performed on the steady-state boost signal. At step 517, the adjusted boost signal is sent to the turbo via the actuator 123, and the process continues with step 501.

Although the present invention is described through the example of the ECM 121 determining the boost by generating a turbo control signal for the actuator 123 in the embodiment described herein, other devices or processes may be utilized to provide this function. Although the present invention is illustrated through a form of turbine control that involves adjusting the position of vanes of a variable geometry turbocharger, the present invention may also be applied to other types of turbochargers.

Although the present invention is illustrated by the example of a six-cylinder engine, the present invention may be applied to: engines having one or more cylinders; various engine types, such as in-line, V-type, and so forth; engines having different cylinder firing orders; diesel engines, gasoline engines, or other types of engines; and engines of any size.

The present invention provides the advantage of independently adjusting the turbocharger boost for engine speed transients and/or engine load transients, e.g., by adjusting turbine vane position. In high transient engine conditions, when poor air flow is likely to be present, the turbo boost is increased to allow for better air flow to the engine, e.g., by closing the vanes more. Similarly, when little or no transient engine conditions are present, good air flow is likely to be present, the turbocharger pressure is determined as usual. When engine conditions exist such that the air-to-fuel ratio is low, turbo boost or backpressure is increased. Better engine performance results, including better air-fuel ratio, reduced air flow instability, reduced engine stumbling, reduced white and black smoke, and/or reduced noise. Lower NOx, hydrocarbons, smoke, and/or particulate matter emissions result. Overall engine performance is improved during engine transient conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   determining a steady-state pulse-width modulated control signal for a turbocharger for an internal combustion engine in an Electronic Control Module (ECM) based on a steady-state boost setpoint value that depends on engine speed and engine load;
   adjusting the steady-state control signal for at least one of current transient speed conditions and current transient load conditions of the internal combustion engine, yielding an adjusted control signal;
   sending the adjusted control signal from the ECU to the turbocharger.

2. The method of claim 1, further comprising the step of adjusting the steady-state control signal based on current transient speed conditions and current transient load conditions of the internal combustion engine, yielding the adjusted control signal.

3. The method of claim 1, wherein the turbocharger is comprised of a plurality of vanes, wherein the vanes are more open when at least one of the current transient speed conditions are high and the current transient load conditions are large.

4. The method of claim 1, wherein the steady-state control signal is based on a load and an engine speed for the internal combustion engine.

5. The method of claim 1, wherein the steady-state control signal is provided by a turbo control signal and the adjusted control signal is provided by an adjusted turbo control signal.

6. The method of claim 1, wherein the step of adjusting comprises determining at least one of (a) a load transient offset based on current engine speed and transient engine load and (b) a speed transient offset based on current engine speed and transient engine speed.

7. The method of claim 6, wherein the load transient offset has a value between 0 and 1, wherein the speed transient offset has a value between 0 and 1, and wherein the adjusted control signal has a range of values between 0 and 1, where 0 represents minimum turbocharger boost and 1 represents maximum turbocharger boost.

8. A method comprising the steps of:
   determining a load and an engine speed for an internal combustion engine;
   determining a boost setpoint in an electronic control module (ECM) for the internal combustion engine based on the load and the engine speed;
   determining a steady-state turbocharger control signal based on the boost setpoint in a controller;
   determining at least one of a load transient offset based on current transient load conditions for the internal combustion engine and a speed transient offset based on current transient speed conditions for the internal combustion engine;

adjusting the steady-state turbocharger control signal based on the load, the engine speed, and at least one of the load transient offset and the speed transient offset, yielding an adjusted control signal.

9. The method of claim 8, wherein the turbocharger is comprised of a plurality of vanes, wherein the vanes are more closed when at least one of the current transient speed conditions are high and the current transient load conditions are large.

10. The method of claim 8, wherein the load transient offset has a value between 0 and 1, wherein the speed transient offset has a value between 0 and 1, and wherein the adjusted control signal has a range of values between 0 and 1, where 0 represents minimum turbocharger boost and 1 represents maximum turbocharger boost.

11. The method of claim 8, wherein the adjusted control signal is provided by an adjusted turbo control signal.

12. An apparatus comprising:
an actuator capable of adjusting boost for a turbocharger for an internal combustion engine, wherein the actuator is arranged and constructed to receive an adjusted control signal and adjust the turbocharger to generate boost in accordance with the adjusted control signal;
a steady-state boost determiner, arranged and constructed to receive an engine speed value, an engine boost value, and an engine load value to generate a steady-state boost setpoint and use a difference between the steady-state boost setpoint and the engine boost value to calculate a steady-state control signal;
a load transient offset determiner, arranged and constructed to receive the engine speed value and an engine load transient value and to generate a load transient offset;
a speed transient offset determiner, arranged and constructed to receive the engine speed value and an engine speed transient value and to generate a speed transient offset;
a combiner arranged and constructed to combine the steady-state control signal, the load transient offset, and the speed transient offset, yielding the adjusted control signal.

13. The apparatus of claim 12, wherein the steady-state boost determiner generates a value between 0 and 1, wherein the load transient offset determiner generates a value between 0 and 1, and wherein the speed transient offset determiner generates a value between 0 and 1.

14. The apparatus of claim 12, wherein the load transient offset is closer to 1 when the engine load transient value is large, wherein the load transient offset is closer to 0 when the engine load transient value is small, wherein the speed transient offset is closer to 1 when the engine speed transient value is large, and wherein the speed transient offset is closer to 0 when the engine speed transient value is small.

15. The apparatus of claim 12, wherein the turbocharger is comprised of a plurality of vanes, wherein an adjusted control signal equal to 0 corresponds to fully open vanes, and wherein a valve operator position signal equal to 1 corresponds to fully closed vanes.

16. The apparatus of claim 12, wherein the adjusted control signal is an adjusted turbo control signal; wherein the steady-state control signal is a steady state turbo control signal, and wherein the adjusted control signal is an adjusted turbo control signal.

17. The apparatus of claim 12, wherein the combiner is an adder.

18. An internal combustion engine comprising the apparatus of claim 12.

* * * * *